(12) United States Patent
Hakimi et al.

(10) Patent No.: US 6,370,297 B1
(45) Date of Patent: Apr. 9, 2002

(54) SIDE PUMPED OPTICAL AMPLIFIERS AND LASERS

(75) Inventors: Farhad Hakimi; Hosain Hakimi, both of Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/282,878

(22) Filed: Mar. 31, 1999

(51) Int. Cl.⁷ ................................................ G02B 6/26
(52) U.S. Cl. ........................ 385/27; 385/30; 385/31; 385/50; 359/341.1; 372/6
(58) Field of Search ................................ 385/27, 30, 31, 385/49, 50, 88, 89; 359/341; 372/6

(56) References Cited

U.S. PATENT DOCUMENTS

| | | | | |
|---|---|---|---|---|
| 4,815,079 A | * | 3/1989 | Snitzer et al. ................. 372/6 |
| 5,058,980 A | * | 10/1991 | Howerton ..................... 385/31 |
| 5,815,309 A | * | 9/1998 | Lawrence et al. ........... 359/333 |
| 5,854,865 A | * | 12/1998 | Goldberg ..................... 385/31 |
| 5,999,673 A | * | 12/1999 | Valentin et al. ............... 385/43 |
| 6,031,850 A | * | 2/2000 | Cheo ............................. 372/6 |

* cited by examiner

*Primary Examiner*—Hemang Sanghavi
*Assistant Examiner*—Sung Pak
(74) *Attorney, Agent, or Firm*—Fish & Richardson P.C.

(57) ABSTRACT

An optical amplifier includes first and second optical fibers. The first optical fiber has a core, a first cladding surrounding the core and a second cladding surrounding the first cladding. The second optical fiber has an end physically coupled to a side portion of the first optical fiber. The end transmits light to the first cladding.

28 Claims, 8 Drawing Sheets

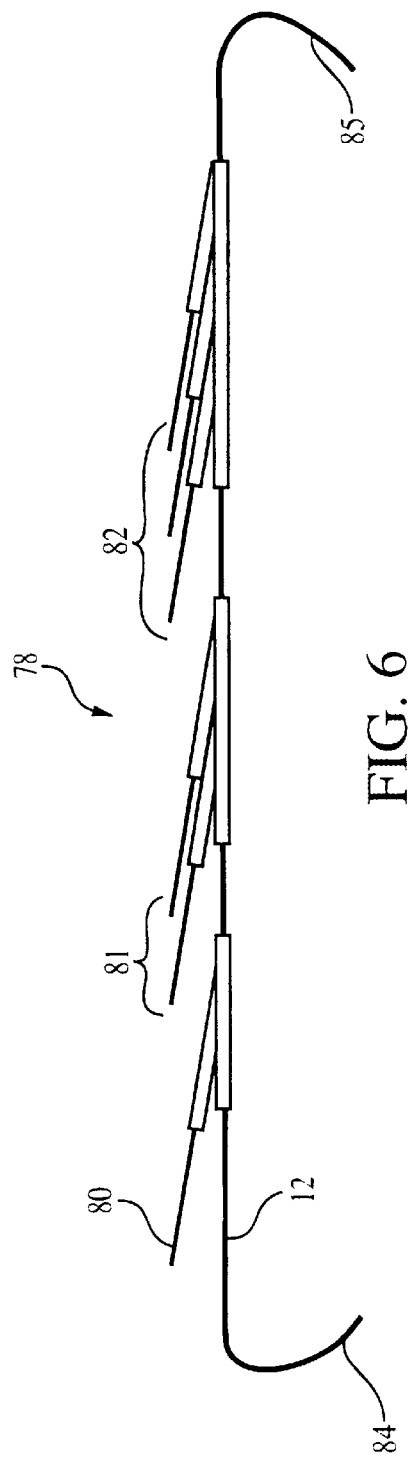
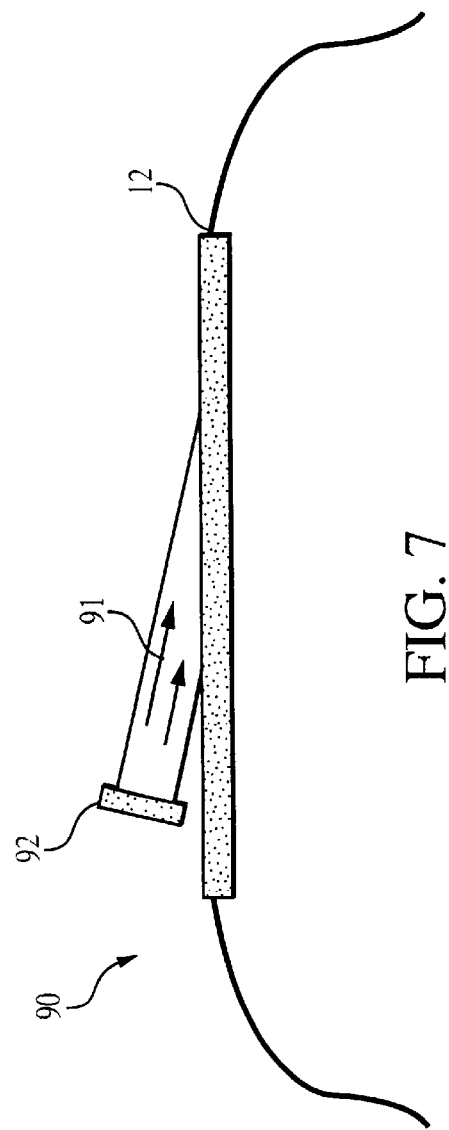
FIG. 6
FIG. 7

SIDE PUMPED OPTICAL AMPLIFIERS AND LASERS

This invention was made with government support under Contract Number F19628-95-C-0002 awarded by the Air Force. The government has certain rights in the invention.

BACKGROUND OF THE INVENTION

This invention relates generally to optical fibers and, more particularly, to fiber amplifiers and lasers.

Rare-earth doped fiber lasers have many potential applications in telecommunications, sensors, spectroscopy, laser radar, and medicine. They are widely recognized as efficient configurations for generating light in a single transverse mode.

Rare-earth doped fiber lasers generate laser light from de-excitations of rare-earth atoms that dope the fiber's core. The rare-earth atoms are excited by an external pump source. The power from the pump source determines the laser's output power. Generally, rare-earth fiber lasers are low power devices, because low power pump sources provide the power for the fiber lasers. High power pump sources, such as multi-spatial mode laser diodes, are difficult to couple to the doped cores.

For example, locating a single spatial mode diode laser near one end of the fiber enables pumping the rare earth dopants of the fiber core. Since the doped core typically has a narrow cross section, a small single mode diode laser is efficient for introducing pump light into the doped core. But, single spatial mode diode lasers produce pump light powers in the range of a few hundred milli-watts. When pumped by such a source, a rare earth doped core produces low powers in the range of about a hundred milli-watts.

Some fiber lasers enclose the doped core by a larger diameter cladding. In such lasers, pump light enters into the cladding and then, subsequently excites the doped core. Since the cladding diameter is larger, the cladding can capture light from larger pump sources, such as multi-spatial mode laser diodes. Nevertheless, the high power pump sources may still produce undesirable heating in the amplifying fiber.

SUMMARY OF THE INVENTION

In a first aspect, the invention is an optical amplifier. The optical amplifier includes first and second optical fibers. The first optical fiber has a core, a first cladding surrounding the core and a second cladding surrounding the first cladding. The second optical fiber has an end optically coupled to a side portion of the first optical fiber. The end transmits light to the first cladding.

In a second aspect, the invention is an optical fiber amplifier. The amplifier includes an optical fiber and an optical waveguide. The optical fiber has a core, a first cladding surrounding the core, and a second cladding surrounding the first cladding. The first cladding has a cross section adapted to redirect light traveling therein into paths intersecting the core. The optical waveguide couples to a side portion of the optical fiber.

In a third aspect, the invention is a method of amplifying a light signal. The method includes transporting light down an optical waveguide using total internal reflection, transmitting a portion of the transported light across a side surface of a double clad fiber. The method uses internal reflections to redirect most of the transmitted light along paths intersecting a core of the double clad fiber. The light intersecting the core generates an inverted population of exciting atoms therein.

Various embodiments provide high power amplifiers by side-pumping a multi-clad fiber with an optically excitable core.

Various embodiments provide high power amplifiers in which pumping heat is delocalized over the amplifying fiber instead of localized at one end.

Various embodiments provide a high power fiber amplifier in which the fiber's ends are freely accessible.

Various embodiments provide a fiber amplifier which directly side-couple pumping fibers or optical conduits to the amplifying fiber.

BRIEF DESCRIPTION OF THE DRAWINGS

Other objects, features, and advantages of the invention will be apparent from the following description taken together with the drawings in which:

FIG. 6 illustrates another embodiment of the optical amplifier of FIG. 1A having a non-uniform density of pump fibers;

FIG. 7 illustrates an optical amplifier employing a slab waveguide for optical pumping.

DESCRIPTION OF THE PREFERRED EMBODIMENTS

Figure 1A:
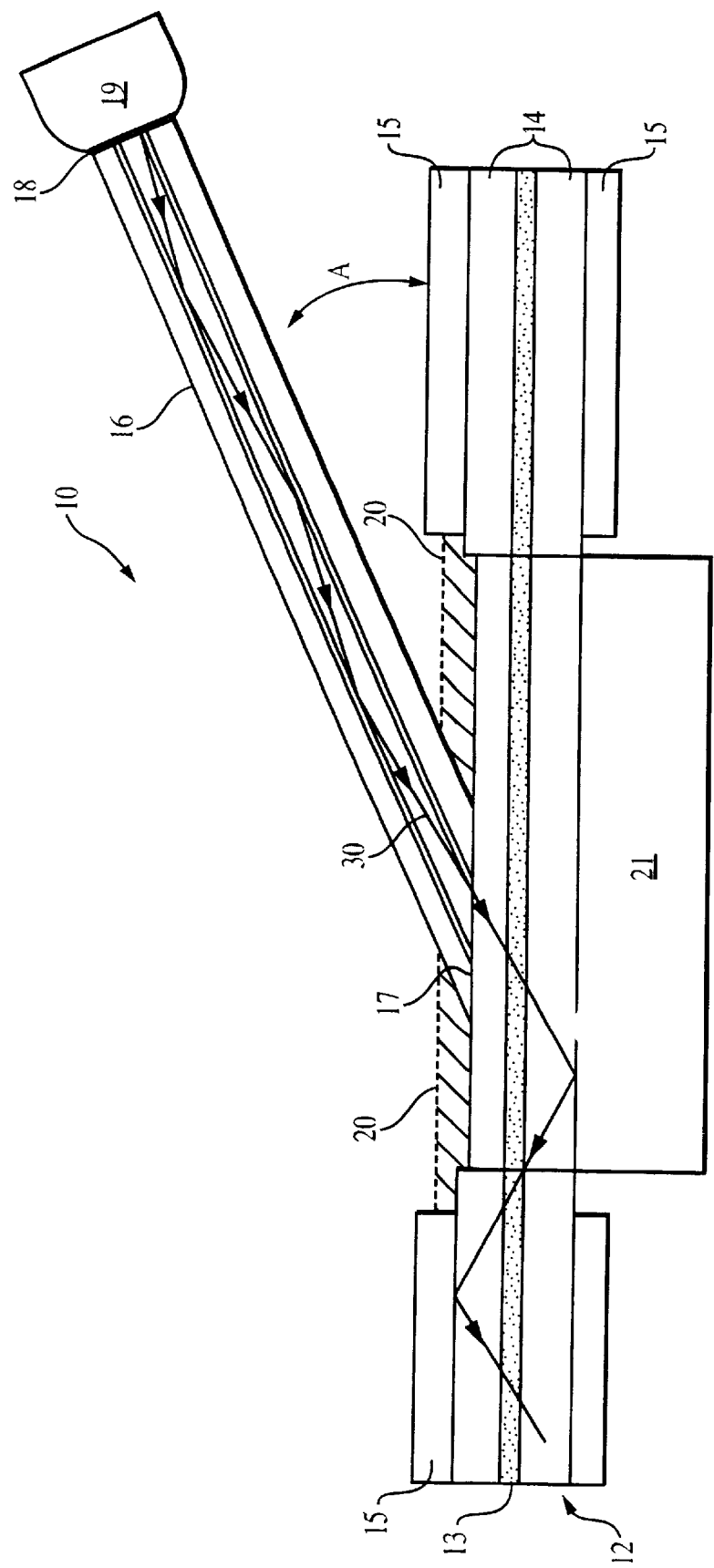
FIG. 1A illustrates an embodiment of an optical amplifier employing a double clad amplifying fiber.

FIG. 1A illustrates an optical amplifier 10, which uses an amplifying fiber 12 having a double cladding. The amplifying fiber 12 has a core 13 containing optically active dopants such as rare earth elements. The core 13 is enclosed in a first cladding 14, and a second cladding 15, e.g., a plastic layer. The index of refraction of the core 13 is greater than that of the first cladding 14, and the index of refraction of the first cladding 14 is greater than that of the second cladding 15. Thus, a light ray can propagate in either the core 13 or the first cladding 14 by undergoing total internal reflections at the interfaces adjacent the first cladding 14.

The amplifying fiber 12 receives pumping light from a side-coupled pump fiber 16. One end 17 of the pump fiber 16 makes a direct coupling to the first cladding 14, and a second end 18 of the pump fiber 16 optically couples to a source of pump light. By coupling the pump fiber 16 to the wide first cladding 14, as opposed to the narrow core 13, the pump fiber 16 can efficiently transmit multi-spatial mode light to the amplifying fiber 12.

Side-coupling the pump fiber 16 directly to the cladding 14 of the amplifying fiber 12 enables the use of multi-spatial mode light for the pump source 19. A multi-spatial mode laser diode can generate tens or hundreds of watts of optical power as opposed to the fractions of a watt available from typical single-spatial mode laser diode sources. If the side-coupled pump source 19 is a multi-spatial mode laser diode, the optical amplifier 10 can produce high output powers, e.g., hundreds of watts.

To improve the coupling between the pump fiber 16 and the first cladding 14, the end 17 of the pump fiber 16 is angle polished to 70 degrees or more and fit snugly against the first cladding 14. In the joint region, the second cladding 15 is removed so that pump light enters directly from the pump fiber 16 into the first cladding 14. A layer of plastic 20 covers the joint region to protect the fiber 12.

Figure 1B:
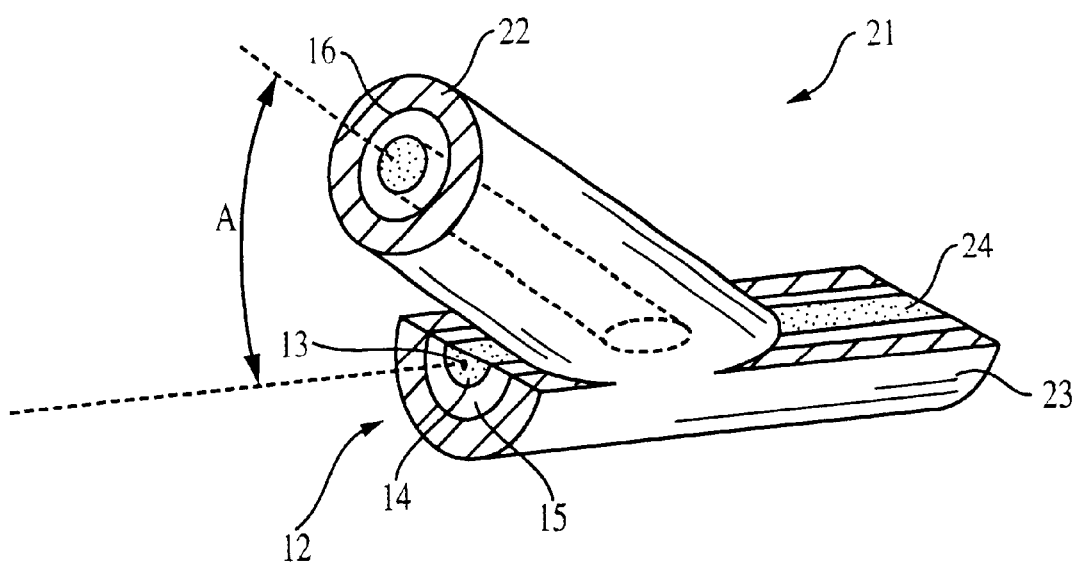
FIG. 1B illustrates the geometry of the joint between the pump and amplifying fibers.

The geometry of the joint between the amplifying and pump fibers 12, 16 is illustrated by a cut away view in FIG. 1B. A mounting device 21 rigidly couples the amplifying and pump fibers 12, 16. The shown mounting device 21 has a general "Y" shape and consists of two intersecting and rigidly joined cylindrical ferrules 22, 23. The ferrules 22, 23 hold the two fibers 12, 16 at a fixed relative angular alignment "A". The fibers 12, 16 may fix into the device 21 through a variety of means known in the art, e.g., soldering, welding, UV curing, or epoxying.

In the joint region, the amplifying fiber 12 is shaped by polishing to improve absorption of the pump light by the core 13. The polishing gives the first cladding 14 a flat surface 24 bounded by sharp edges in the region adjacent the end 17 of the pump fiber 16. Due to the flat surface 24, the first cladding 14 has a non-circularly symmetric cross section in the joint region. The nonsymmetric region of the first cladding 14 may be a few millimeters to several inches in length. The lack of circular symmetry and associated sharp edges of the surface 24 enhance the mixing of the various modes that propagate in the first cladding 14. By increasing the mixing between the propagating modes of the first cladding 14, the joint region improves the eventual transfer of pump light to the doped core 13.

Figure 2A:
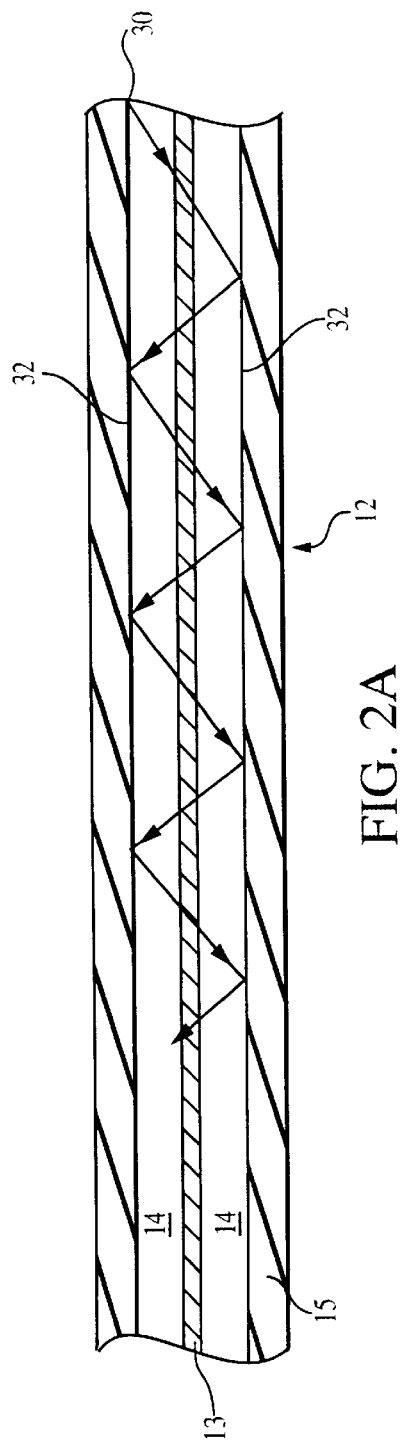
FIGS. 2A and 2B are respective longitudinal and cross-sectional views of the amplifying fiber of FIG. 1A.
Figure 2B:
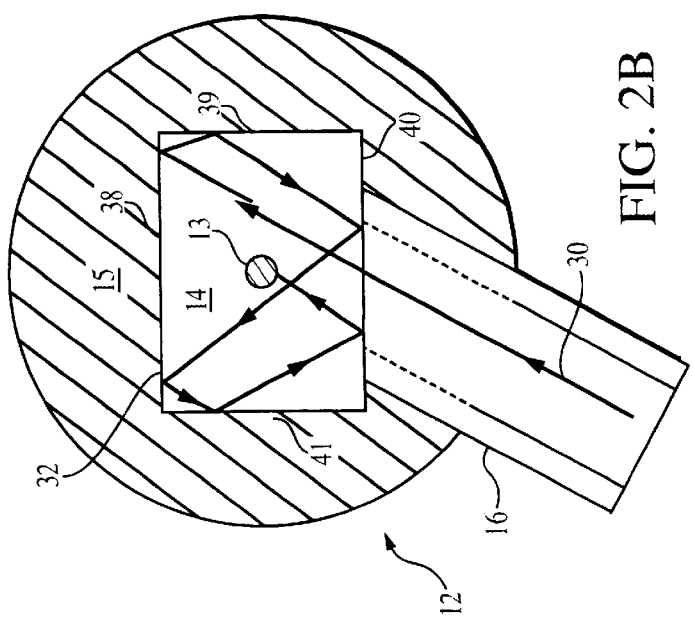

The absorption of pump light is illustrated by FIGS. 2A and 2B, which show a ray 30 of pump light propagating in the fibers 16 and 12 in longitudinal and cross-sectional views, respectively. The ray 30 leaves the pump fiber 16 and enters directly into the first cladding 14. The ray 30 propagates inside the first cladding 14 by making repeated total internal reflections off the interface 32 between the first and second claddings 14, 15. These reflections result from the lower index of refraction of the second cladding 15 with respect to the first cladding 14. The ray 30 continues to bounce along the interior of the first cladding 14 until encountering the core 13.

The core 13 contains optically excitable dopants, which absorb pump light. For example, the dopants may be rare earth elements such as erbium, ytterbium, neodymium, praseodymium, and thulium. Absorptions excite dopant atoms thereby providing the inverted population, which subsequently provides the energy for optical amplification. Thus, if more dopant atoms of the core 13 absorb pump light, more energy is available for optical amplification. More dopant atoms absorb pump light if the rays of pump light, e.g., the ray 30, intersect the small core 13 more frequently.

Figure 2C:
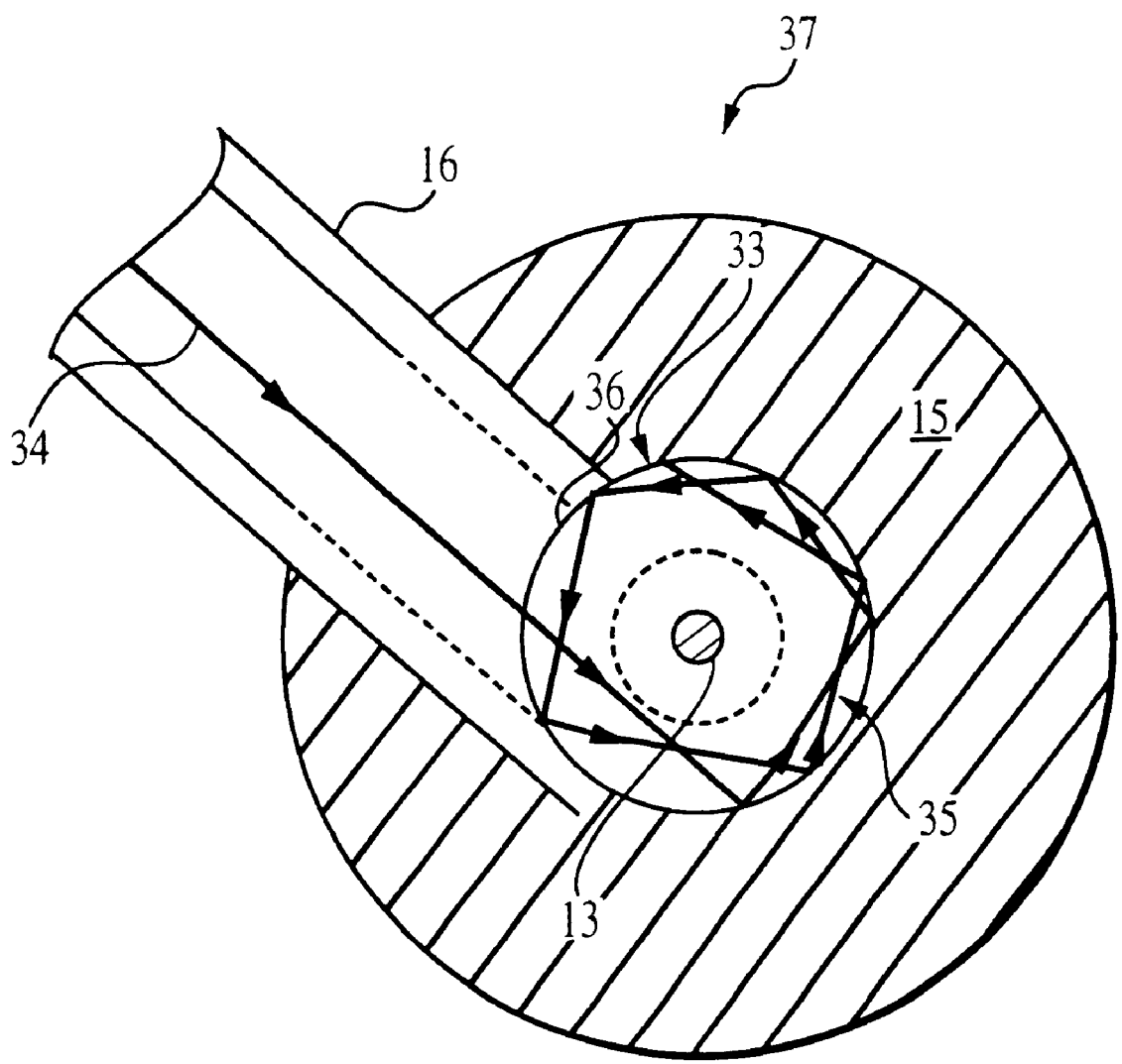
FIG. 2C is a cross-sectional view of a circularly symmetric amplifying fiber.

The absorption of pump light in a first cladding 33 that is circularly about the core 13 is illustrated in a cross-sectional view in FIG. 2C (outside of the joint region of FIG. 1B). In this first cladding 33, a ray of pump light 34 undergoes reflections that redirect the ray 34, with a high probability, into an annular region 35 exterior to the central region where the core 13 is located. Thus, the ray 34 may undergo many reflections from the circularly symmetric surface 36 and still miss the central core 13. Since the ray 34 repeatedly misses the core 13, absorption may be infrequent or rare, and the fiber 37 may not be an efficient amplifying fiber. Nevertheless, a non-symmetric cross section for the first cladding 33 in the joint region of FIG. 1B may induce enough mode mixing to make the fiber 37 an efficient amplifier.

Referring again to FIG. 2B, the first cladding 14 has a cross section that is non-circularly symmetric with respect to the core 13 along the entire length of the amplifying fiber 12. The cross section is non-circularly symmetric due to the flat sides 38–41 on the outer surface 32 of the cladding 14. The flat sides 38–41 give the first cladding 14 a polygonal cross section, which reflects the ray 30 more randomly as the ray 30 propagates down the cladding 14 than the circularly symmetric surface 36 of FIG. 2C. The sides 38–41 force propagating light rays to zigzag across the entire cross-section of the first cladding 14. The zigzagging light rays have a higher probability of intersecting and exciting the core 13. Thus, the non-circular symmetry of the first cladding 14 redirects the rays 30 propagating therein into paths, which intersect the core 13.

Figure 3A:
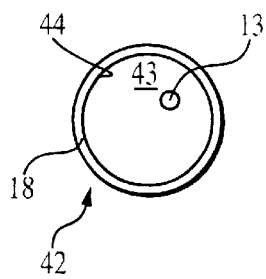
FIGS. 3A–3B are cross-sectional views of alternate embodiments for the double clad amplifying fiber in FIG. 1A.

FIG. 3A is a cross-sectional view of an alternate double clad fiber 42 in which the first cladding 43 redirects propagating light rays to intersect the core 13. In the first cladding 43, the core 13 is offset making the cladding 43 non-circularly symmetric with respect to the core 13. Offsetting the core 13 again increases the probability that light rays reflected off the circular surface 44 of the cladding 43 are redirected towards the core 13. Pump light propagating in the cladding 43 has a higher probability of exciting the doped core 13 than pump light propagating in the cladding 33 shown in FIG. 2C.

Figure 3B:
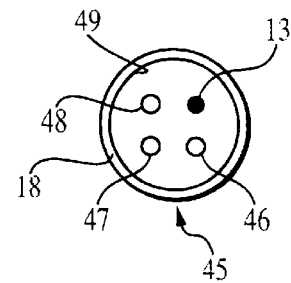

FIG. 3B is a cross-sectional view of an alternate double clad fiber 45 in which the first cladding 49 redirects light rays to intersect the cores 13, 46–48. The multiple cores 13, 46–48 are offset from the center of the first cladding 49 into the region where light rays tend to propagate. The different cores 13, 46–48 may have different rare earth dopants so that they produce amplified signals having different wavelengths.

Figure 4A:
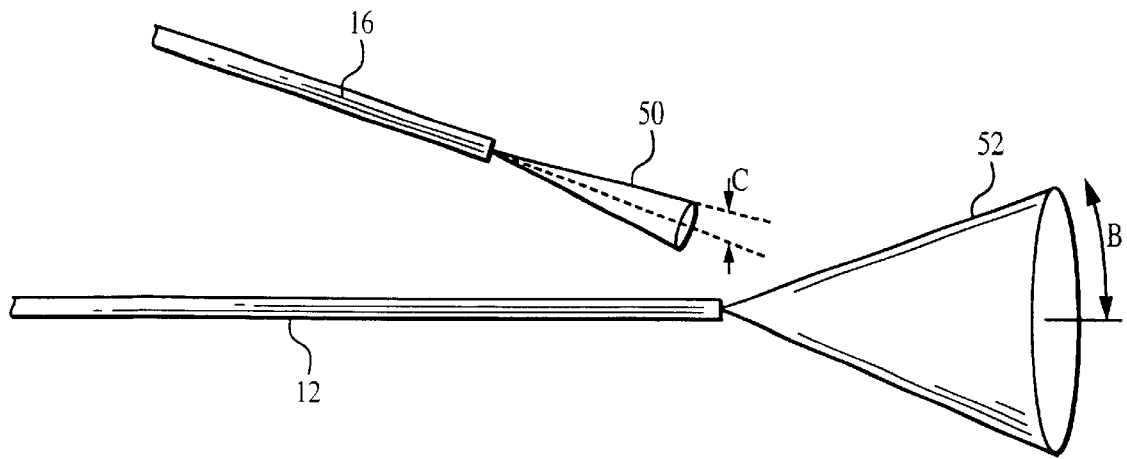
FIG. 4A illustrates the cone of propagation of the pump and amplifying fibers of FIG. 1A.

To further illustrate the propagation of light in the fibers 12 and 16, FIG. 4A shows the cones of propagation 50 and 52 for light in the pump fiber 16 and the first cladding 14 of the amplifying fiber 12, respectively. The cones of propagation 50 and 52 define the maximum angular divergence of a propagating ray with respect to the axis of the fiber 16 and cladding 14. Rays entering the first cladding 14 at an angle outside the cone of propagation 52 do not propagate in the cladding 14. For the pump fiber 16 and the first cladding 14 of the amplifying fiber 12 the maximal angular divergences are "C" and "B", respectively. To effectively couple the amplifying and pump fibers 12, 16, the cone of propagation 52 of the first cladding 14 should be larger than the cone of propagation 50 of the pump fiber 16.

Figure 4B:
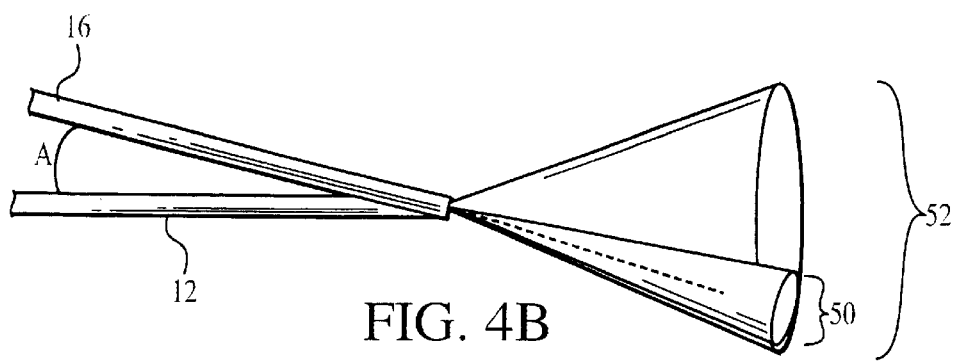
FIG. 4B illustrates limitations on the tilt alignment between the pumping and amplifying fibers of FIG. 1A.

One way of aligning the pump fiber 16 with respect to the amplifying fiber 12 is illustrated in FIG. 4B. For this alignment, the cone of propagation 50 of the pump fiber 16 is located inside the cone of propagation 52 of the first cladding 14. Thus, light from the pump fiber 16 propagates in the first cladding 14. The cone of propagation 50 of the pump fiber 16 is inside that of the first cladding 14 if the tilt angle A is less than the difference of the maximal angular divergences, i.e. A<B−C.

Figure 5A:
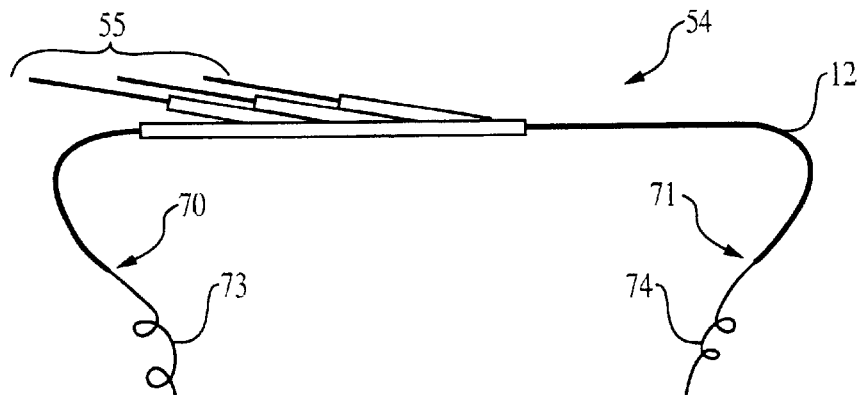
FIGS. 5A–5C illustrate embodiments of the optical amplifier of FIG. 1A having a plurality of pump fibers.
Figure 5B:
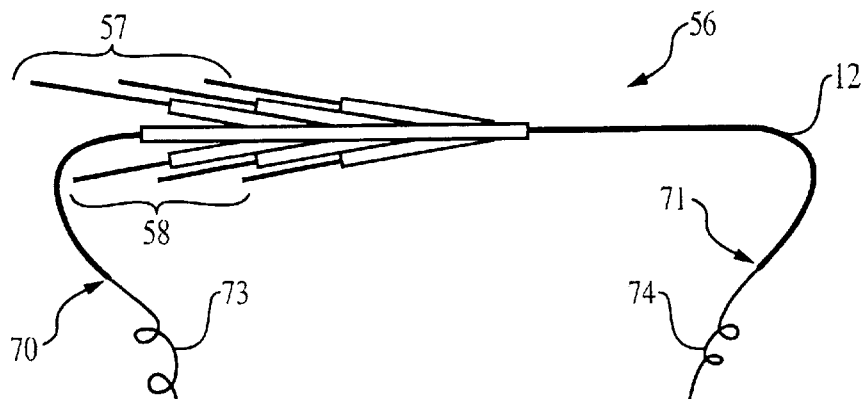
Figure 5C:
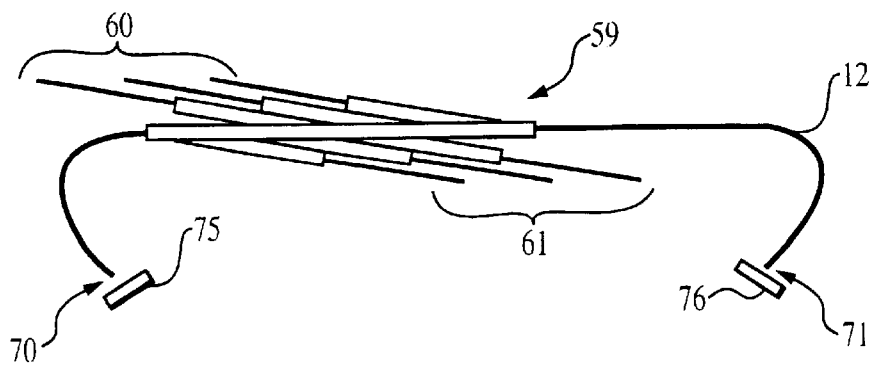

FIGS. 5A–5C illustrate alternate embodiments of optical amplifiers 54, 56, 59, which couple multiple pump fibers 55, 57, 58, 60, 61 to the amplifying fiber 12 of FIG. 1. In FIG. 5A, the pump fibers 55 are substantially parallel and join the amplifying fiber 12 along the same side. In FIG. 5B, the pump fibers 57, 58 join different sides of the amplifying fiber 12 making substantially equal tilt angles with respect to axis of the amplifying fiber 12. In FIG. 5C, the pump fibers 59 join different sides of the amplifying fiber 12 and have substantially complementary tilt angles.

The tilt angles of the various pump fibers 55, 57, 58, 60, 61 may vary in the amplifiers 54, 56, 59 of FIGS. 5A–5C. But, each pump fiber has a tilt angle with respect to the amplifying fiber 12, which satisfies the conditions defined by the cones of propagation 50, 52 of FIGS. 4A and 4B.

In the optical amplifiers 54, 56, 59, both ends 70–71 of the amplifying fiber 12 are free. Thus, the first end 70 can act as an input port for an optical signal, and the second end 71 can act as an output port for an amplified signal. The input and amplified signals may be delivered to and removed from the amplifiers 54, 56 by optical fibers 73, 74, which couple to the free ends 70, 71 (FIGS. 5A–5B). The free first and second ends 70–71 can also accommodate reflectors 75–76, e.g., fiber Bragg gratings, for a fiber laser (FIG. 5C).

The pump fibers 55, 57–58, 60–61 also distribute pumping points along a long segment of the amplifying fiber 12. Spreading the pumping points out enables higher output power, e.g., 10–100 watts, because pumping can excite a longer region of the core 13, which contains more dopant atoms. Spreading the pumping points also lowers the risk that pumping heat will impede the action of the amplifying fiber 12. The heat created by pumping lowers the lifetime of the dopant atoms that form the inverted population used in amplification. This reduces the average number of excited dopant atoms available to emit light and the energy available for optical amplification. Since the pump fibers 55, 57–58, 60–61 are distributed along the fiber 12, pumping heat is also distributed along the fiber 12 and not concentrated at one point, e.g. one of the ends 70, 71. Thus, temperatures in the core 13 do not rise as high, and pumping heat has a less adverse effect on the inverted population of dopant atoms increasing the average number of excited atoms available for amplification.

FIG. 6 illustrates an alternate optical amplifier 78 in which optical pumping is non-uniformly distributed along the amplifying fiber 12. Less pump fibers 80 side-couple to the amplifying fiber 12 near the input terminal 84 of the amplifier 78 where the signal is weaker. More pump fibers 82 couple to the amplifying fiber 12 near the output terminal 85 of the amplifier 78 where the signal is stronger. The higher density of the pump fibers 82 in regions where the signal is stronger produces a higher density of excited dopant atoms in that region and can enhance amplification.

FIG. 7 is an alternate optical amplifier 90 in which the pumping waveguide is a ribbon-like slab 91. The slab 91 transports pump light from an extended source 92, e.g., an extended or multi-spatial mode diode laser, to the first cladding 14 of the amplifying fiber 12. The pump light travels down the interior of the slab 91 by undergoing total internal reflections analogous to those occurring inside an optical fiber. Using the slab 91, the extended light source 92 can pump a large amount of light energy into the first cladding 14 of the amplifying fiber 12 while spreading heating over a long length of the fiber 12.

Figure 8:
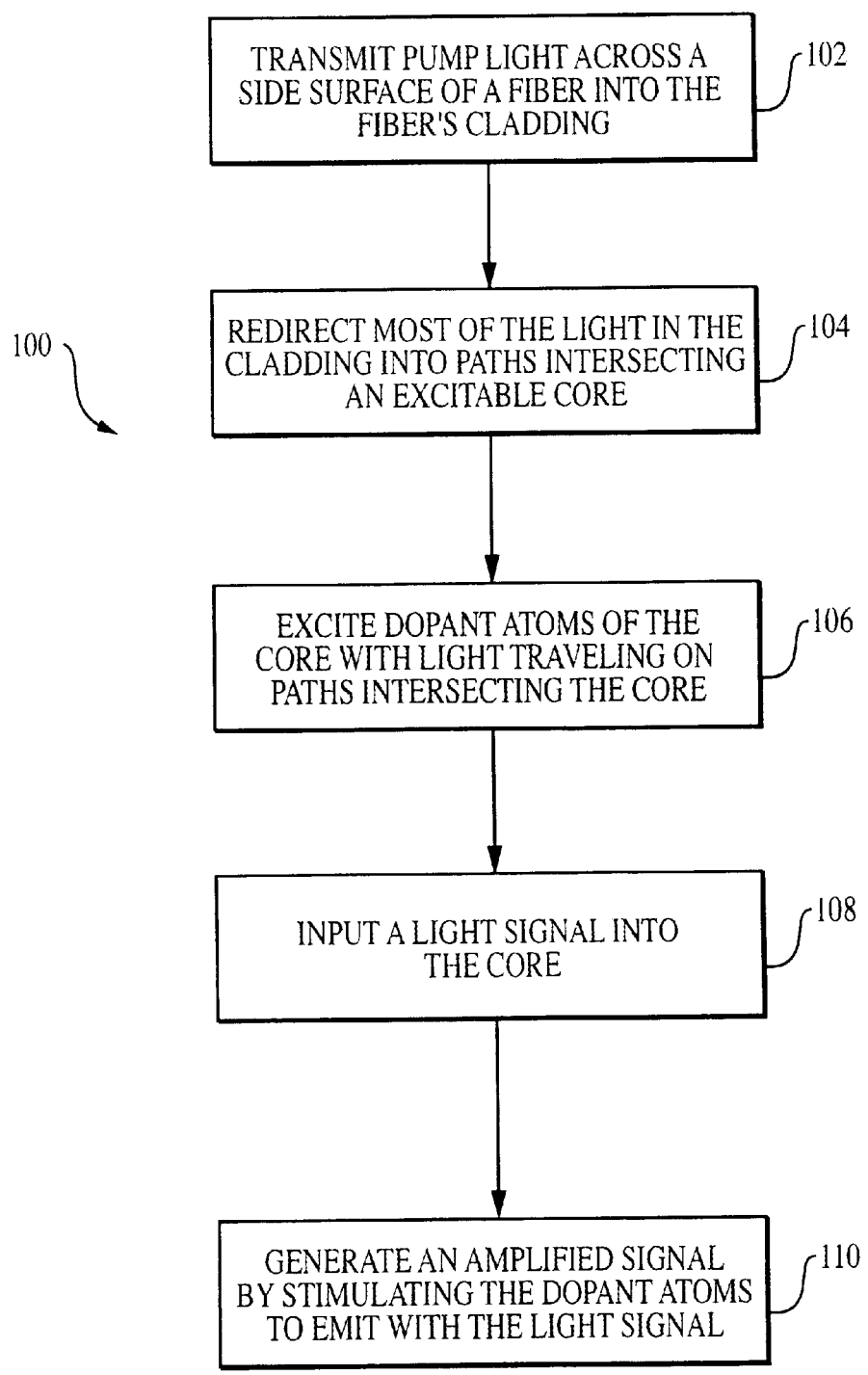
FIG. 8 is a flow chart illustrating a method of optically amplifying a light signal.

FIG. 8 is a flow chart for a method 100 of amplifying a light signal. A waveguide, e.g., the pump fiber 16 of FIG. 1, transmits pump light across a side surface of an optical fiber into the fiber's cladding, e.g., the first cladding 14 of FIG. 1 (step 102). By internal reflection, the cladding redirects most of the transmitted light along paths intersecting an excitable core, e.g., the doped core 13 in FIG. 1 (step 104). To redirect the light, the cladding may reflect the light off flat cladding interfaces, e.g. the interfaces 38–40 of FIG. 2A, to randomize the light's path across the cross section of the cladding. The cladding may also redirect the light by reflecting the light along paths intersecting an offset the core 13. Finally, the cladding may also redirect light through mode mixing caused by localized variations in the cladding's cross section, e.g., the joint region shown in FIG. 1B. A portion of the light propagating on the paths that intersect the core 13 excites dopant atoms (step 106). A source inputs a light signal into one end of the core 13 of the double clad fiber (step 108). The input light stimulates emissions from the dopant atoms and generates an amplified output light signal at the second free end of the amplifying fiber, e.g., the fiber 12 (step 110).

Other embodiments are within the scope of the following claims.

What is claimed is:

1. An optical amplifier, comprising:
a first optical fiber comprising a core, a first cladding surrounding the core and a second cladding surrounding the first cladding, wherein over a predefined region of the first optical fiber, the second cladding is removed so as to expose an underlying portion of the first cladding and wherein within the exposed portion of the first cladding some of the first cladding has been removed to form a flat surface; and
a second optical fiber having an end physically abutting the flat surface of the first cladding, the end to transmit light into the first cladding.

2. The optical amplifier of claim 1, wherein the core further comprises dopant atoms capable of being optically excited to form an inverted population.

3. The optical amplifier of claim 2, wherein the dopant atoms are rare earth element atoms.

4. The optical amplifier of claim 2, wherein the dopant atoms comprise one of neodymium, ytterbium, erbium, praseodymium, and thulium.

5. The optical amplifier of claim 1, wherein the first cladding outside of the predefined region has circular symmetry about a longitudinal axis of the first cladding and wherein within the predefined region the flat surface of the first cladding breaks circular symmetry of the first cladding.

6. The optical amplifier of claim 5, wherein the core is offset from the longitudinal axis of the first cladding.

7. The optical amplifier of claim 1, wherein a tilt angle of the second optical fiber with respect to the first optical fiber positions a second cone of propagation of the second fiber inside a first cone of propagation of the first cladding.

8. The optical amplifier of claim 7, further comprising:
a multi-spatial mode diode laser coupled to a second end of the second fiber.

9. The optical amplifier of claim 1, wherein said end of the second optical fiber is angled and flat and abutting the flat surface the first cladding.

10. The optical amplifier of claim 9, wherein the portion of the first cladding adjacent the end provokes mixing between propagating modes in the first cladding.

11. The optical amplifier of claim 1, wherein the flat surface of the first cladding is a polished surface.

12. The optical amplifier of claim 11, wherein the end of the second fiber that abuts the flat surface of the first cladding is a polished flat surface.

13. The optical amplifier of claim 11, wherein the end of the second fiber that abuts the flat surface of the first cladding is a flat surface that is angled relative to a longitudinal axis of the second optical fiber.

14. The optical amplifier of claim 1, wherein the first cladding has a substantially polygonal cross section.

15. The optical amplifier of claim 1, further comprising:
   a plurality of additional second optical fibers, each additional second optical fiber having an end optically coupled to the flat surface of the first cladding to transmit light to the first cladding.

16. The optical amplifier of claim 1, wherein most optical paths of rays propagating within the first cladding intersect the core.

17. The optical amplifier of claim 1, further comprising a second core surrounded by the first cladding.

18. An optical fiber amplifier, comprising:
   an optical fiber comprising:
      a core:
      a first cladding surrounding the core, the first cladding having a cross section adapted to redirect light propagating in the cladding into paths intersecting the core; and
      a second cladding surrounding the first cladding, wherein over a predefined region of the optical fiber, the second cladding is removed so as to expose an underlying portion of the first cladding and wherein within the exposed portion of the first cladding some of the first cladding has been removed to form a flat surface; and
   an optical waveguide coupled to the flat surface of the first cladding.

19. The optical amplifier of claim 18, wherein the core further comprises dopants capable of being optically excited to form an inverted population.

20. The optical amplifier of claim 19, wherein dopants comprise rare-earth element atoms.

21. The optical amplifier of claim 18, wherein the optical waveguide is a slab adapted to use total internal reflection to direct pump light toward the optical fiber, the optical fiber being substantially co-planar with the slab-like structure.

22. The optical amplifier of claim 21, wherein one edge of the slab physically connects to the flat surface of the first cladding.

23. The optical amplifier of claim 22, further comprising an extended source of pump light, the source coupling to an opposite edge of the slab.

24. The optical amplifier of claim 18, wherein the cross section has a substantially polygonal form.

25. The optical amplifier of claim 18, wherein the core is offset from the center of the first cladding.

26. The optical amplifier of claim 18, further comprising:
   a second optical fiber connected to a first end of the core to provide an input optical signal; and
   a third optical fiber connected to a second end of the core to remove an amplified optical signal.

27. The optical amplifier of claim 18, further comprising first and second optical reflectors connecting to first and second ends of the core to terminate a laser cavity.

28. The optical amplifier of claim 18, further comprising a second core surrounded by the first cladding, the cross section of the first cladding adapted to redirect light propagating therein into paths intersecting the core.

* * * * *